(12) United States Patent
Yamashita et al.

(10) Patent No.: US 7,802,813 B2
(45) Date of Patent: Sep. 28, 2010

(54) TUBULAR PART

(75) Inventors: Haruhiko Yamashita, Hyogo (JP); Teruhiko Oshio, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 175 days.

(21) Appl. No.: 12/230,032

(22) Filed: Aug. 21, 2008

(65) Prior Publication Data

US 2009/0051152 A1  Feb. 26, 2009

Related U.S. Application Data

(60) Provisional application No. 60/968,494, filed on Aug. 28, 2007.

(30) Foreign Application Priority Data

Aug. 23, 2007  (JP)  ............................. 2007-216946

(51) Int. Cl.
*B60R 21/26* (2006.01)
*B60R 21/217* (2006.01)
(52) U.S. Cl. ...................................... 280/741; 403/274
(58) Field of Classification Search ................. 280/741, 280/736; 403/274; 102/202, 202.1, 531; 285/286.1, 286.2, 382
See application file for complete search history.

(56) References Cited

U.S. PATENT DOCUMENTS

| 5,382,415 | A | * | 1/1995 | Kishimoto et al. .......... 422/305 |
| 5,571,271 | A |   | 11/1996 | Kobari et al. |
| 5,711,547 | A | * | 1/1998 | Blumenthal et al. ......... 280/737 |
| 6,053,531 | A |   | 4/2000 | Katsuda et al. |
| 6,464,254 | B2 | * | 10/2002 | Chikaraishi et al. ......... 280/741 |
| 6,692,040 | B1 | * | 2/2004 | McKay et al. .............. 285/382 |
| 7,077,428 | B2 | * | 7/2006 | Barker et al. ................ 280/736 |
| 7,134,689 | B2 |   | 11/2006 | Matsuda et al. |
| 7,178,828 | B2 |   | 2/2007 | Blackburn |
| 7,343,862 | B2 | * | 3/2008 | McCormick ................ 102/530 |
| 7,654,565 | B2 | * | 2/2010 | McCormick et al. ........ 280/736 |
| 2002/0158455 | A1 | * | 10/2002 | Bergerson et al. .......... 280/737 |
| 2004/0226472 | A1 |   | 11/2004 | Oda |
| 2006/0043716 | A1 | * | 3/2006 | Quioc et al. ................ 280/741 |
| 2009/0121464 | A1 | * | 5/2009 | Numoto et al. ............. 280/741 |

FOREIGN PATENT DOCUMENTS

| JP | 11-59314 A | 3/1999 |
| JP | 2003-161599 A | 6/2003 |
| JP | 2003-226222 A | 8/2003 |

* cited by examiner

*Primary Examiner*—Paul N. Dickson
*Assistant Examiner*—Drew Brown
(74) *Attorney, Agent, or Firm*—Birch, Stewart, Kolasch & Birch, LLP

(57) ABSTRACT

A tubular part for fixing and holding a fixing object part inserted therein, the fixing object part being fixed by inwardly crimping a circumferential wall on a side of one end opening of the tubular part, including: the tubular part having a chamfered corner on an inner peripheral side of the circumferential wall on the side of one end opening, a degree of chamfering being such that chamfering is performed between a point at a thickness T1 measured from an outer circumferential surface of the one end opening and a point at a length L1 measured from an end surface of the opening, and when a thickness of the circumferential wall of the opening is represented as T, $(T-T_1)/T$ being 0.05 to 0.9 and $(T-T_1)/L_1$ being 0.8 to 1.2.

5 Claims, 4 Drawing Sheets (a)   (b)

TUBULAR PART

This nonprovisional application claims priority under 35 U.S.C. §119(a) on Patent Application No. 2007-216946 filed in Japan on 23 Aug. 2007 and 35 U.S.C. §119(e) on U.S. Provisional Application No. 60/968,494 filed on 28 Aug. 2007, which are incorporated by reference.

BACKGROUND OF INVENTION

1. Field of Invention

The present invention relates to a tubular part that can be used as part for an inflator for a restraining device for a vehicle.

2. Description of Related Art

Crimping and fixing an igniter to a housing is a well-known technology in the field of gas generators and the like.

In a gas generator, gas generated inside the housing during actuation is discharged from a gas discharge port formed in the housing and introduced into an airbag or the like. As a result, it is necessary to prevent the gas from leaking at the regions other than the gas discharge port. In particular, with a gas generator using a solid gas generating agent, it is necessary to seal the inside of the housing so as to prevent the solid gas generating agent from absorbing moisture over an operation period (about 10 to 15 years).

For this purpose, it is necessary to avoid the appearance of gaps when the igniter portion is crimped and fixed, and from the standpoint of preventing the igniter from falling out when a gas pressure is applied to the igniter during actuation, it is important that the igniter be fixed to the housing.

U.S. Pat. No. 5,571,271 describes an art for fixing structural parts of a gas generator by crimping. An outer shell container of a gas generator housing described in U.S. Pat. No. 5,571,271 has a tubular shape and, as shown in FIGS. 7 and 8, a taper 39 is formed at an opening end 38 at one end portion on the inner peripheral surface thereof. The ratio $d_1/d_2$ of the thickness $d_1$ of the opening end portion 38 and the thickness $d_2$ of a base portion is disclosed to be 60% to 80% (column 4). When the opening end portion is crimped, a crimped and fixed structure having a comparatively large curvature is obtained, as shown in FIG. 8, thereby inhibiting the appearance of cracks in the crimped portion.

SUMMARY OF INVENTION

The invention relates to a tubular part for fixing and holding a fixing object part inserted therein, the fixing object part being fixed by inwardly crimping a circumferential wall on a side of one end opening of the tubular part, including:

the tubular part having a chamfered corner on an inner peripheral side of the circumferential wall on the side of one end opening, a degree of chamfering being such that chamfering is performed between a point at a thickness $T_1$ measured from an outer circumferential surface of the one end opening and a point at a length $L_1$ measured from an end surface of the opening, and when a thickness of the circumferential wall of the opening is represented as T, $(T-T_1)/T$ being 0.05 to 0.9 and $(T-T_1)/L_1$ being 0.8 to 1.2.

BRIEF DESCRIPTION OF DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

Figure 1:
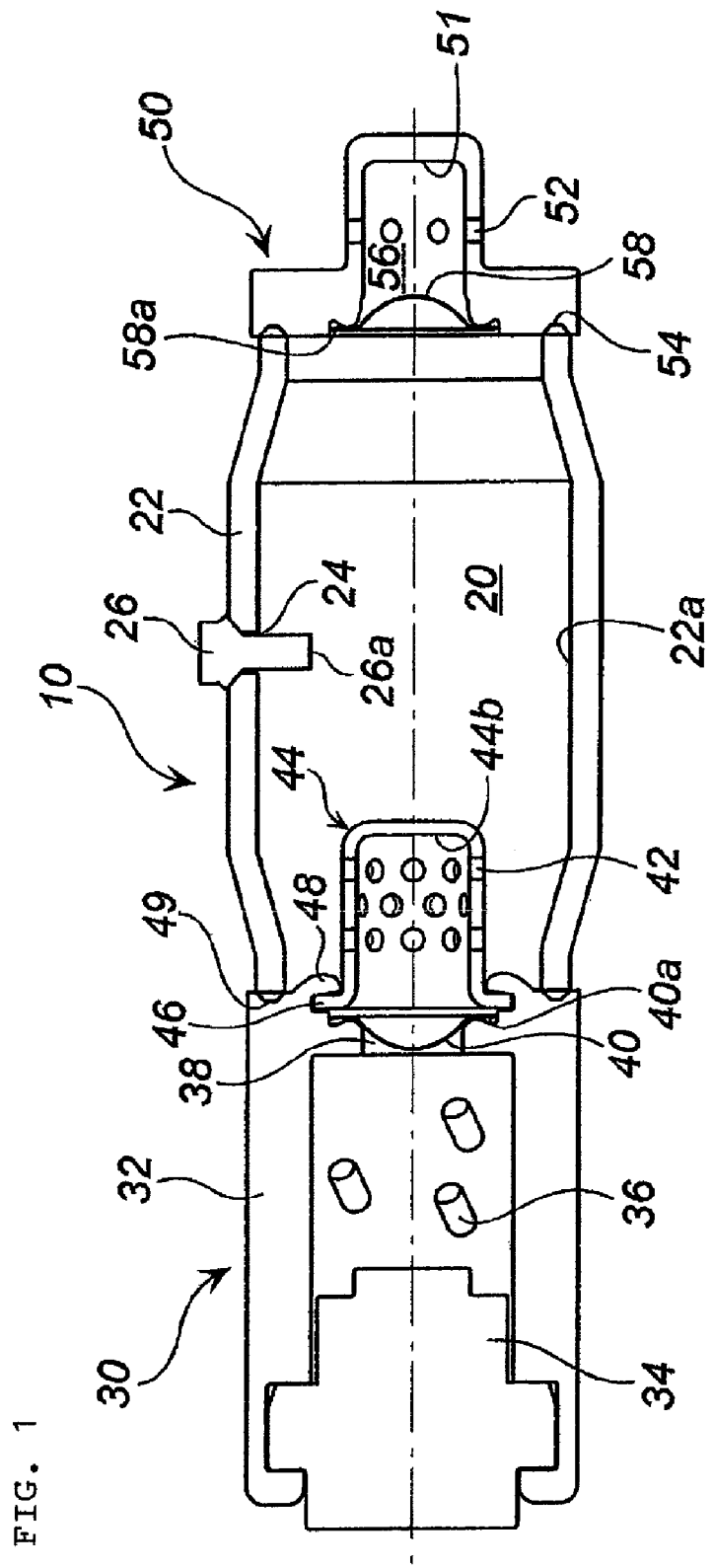
FIG. 1 shows a vertical sectional view of an inflator including a tubular part in accordance with the present invention.

The art described in U.S. Pat. No. 5,571,271 is applied to crimping the portion having a relative large size such as a housing, and when a part of a small diameter such as an igniter used in a gas generator is crimped, a method is usually applied by which a crimped portion is bent at a right angle.

However, in the case of such crimping that involves bending at a right angle, wrinkles and cracks can appear in the crimped portions depending on the shapes thereof, a gap can occur therein, and the durability can be decreased.

The present invention provides a tubular part in which, even when the part is fixed by crimping, occurrence of wrinkles and cracks in the crimped part is prevented and high air tightness can be maintained for a long period of time.

When the fixing object part inserted into the tubular part is crimped and fixed, the circumferential wall on the side of one end opening portion of the tubular part is crimped inward (that is bent inward). In this case, wrinkles and cracks can appear after crimping due to strains on the circumferential wall, and the wrinkles and cracks can cause the appearance of gaps.

Such a problem can be resolved with a crimped and fixed structure having a comparatively large curvature as in the art described in U.S. Pat. No. 5,571,271. However, for example, in an airbag inflator, the fixed structure typically does not have a curved configuration when the igniter is fixed by crimping, and a method of crimping by bending at a right angle is typically employed. Therefore, the probability of strains occurring in the circumferential wall and a gap being created by the strains is higher than in the structure described in U.S. Pat. No. 5,571,271.

In the tubular part in accordance with the present invention, the corner on the inner periphery of the circumferential wall of the one end opening is made to have a specific chamfered shape, whereby flexibility of the portion that will be bent during crimping is increased. As a result, even when crimping and fixing are performed by bending the circumferential wall of the one end opening inward at a right angle, strains are absorbed, therefore, it is possible to prevent the occurrence of wrinkles and cracks and maintain high air tightness for a long period of time.

The invention preferably relates to the tubular part, wherein a taper is formed on the outer peripheral surface side of the circumferential wall on the side of one end opening of the tubular part, and a length $L_2$ of a tapered portion from the end surface of the opening is larger than the length $L_1$.

Thus, by forming a taper on the outer peripheral surface side of the circumferential wall on the side of one end opening of the tubular part, it is possible to increase the effect of maintaining air tightness after crimping and facilitate the crimping operation.

The invention preferably relates to the tubular part, wherein the tubular part is a part for an inflator for a restraining device for a vehicle, and serves to insert and fix an electric igniter used in the inflator.

The tubular part in accordance with the present invention can be used as a variety of housings for fixing an electric igniter, for example, an inflator housing, an igniter housing, and a gas generator housing in a variety of known inflators such as a pyrotechnic inflator using only a gas generating agent as a gas source, a hybrid inflator using a gas generating agent and a pressurized gas as gas sources, an inflator (a curtain inflator and the like) using only pressurized gas as a gas source, an actuator that drives a piston by operation of an igniter, and a gas generator for use in a seatbelt retractor.

With the tubular part in accordance with the present invention, when a fixing object part is inserted and then crimped, the occurrence of wrinkles or cracks in the crimped portion is prevented. As a result, air tightness between the tubular part and fixing object part can be maintained.

PREFERRED EMBODIMENT OF INVENTION

<Inflator Having Tubular Part in Accordance with the Present Invention>

The present invention will be explained below with reference to FIG. 1. FIG. 1 is a vertical sectional view of an inflator including a tubular part in accordance with the present invention, this view being identical to that shown in FIG. 3 of JP-A No. 2003-226222 (however, the shape of the gas generator housing corresponding to the tubular part is partially different from that shown in FIG. 3 of the above document). Further, the tubular part in accordance with the present invention can be applied to the configurations shown in FIG. 1, FIG. 2, FIG. 4 to FIG. 6, and FIG. 10 to FIG. 12 of the above document.

An inflator 10 has a pressurized gas chamber 20, a gas generator 30, and a diffuser portion 50.

In the pressurized gas chamber 20, an outer shell is formed by a tubular pressurized gas chamber housing 22, and the chamber is filled with a pressurized gas composed of a single inert gas such as argon and helium, or a mixture thereof. The pressurized gas chamber housing 22 has a symmetrical shape with respect to the axial direction and radial direction. Therefore, the assembly requires no adjustment of orientation in the axial direction and radial direction.

A charging hole 24 for the pressurized gas is formed in a side surface of the pressurized gas chamber housing 22, and the hole is closed by a pin 26 after the pressurized gas has been loaded. A distal end portion 26a of the pin 26 protrudes inside the pressurized gas chamber 20, and the protruding portion has a length such that a combustion gas flow of a gas generating agent collides therewith. By adjusting the length of the protruding portion of the pin 26, it is possible to cause the collision of the combustion gas with and adhesion of combustion residues to the pin 26 itself. The distal end portion 26a of the pin 26 can be extended to abut against an opposite wall surface 22a.

The gas generator 30 has an ignition device (electric igniter) 34 and a gas generating agent 36 accommodated in a gas generator housing 32 and is connected to one end of the pressurized gas chamber 20. The gas generator housing 32 is a part that corresponds to the tubular part in accordance with the present invention after it has been crimped. The electric igniter 34 is a known igniter in which an igniter body is held by a metallic igniter collar (for example, the igniter collar is denoted by a reference numeral 2 in FIG. 1 of JP-A No. 2003-161599 or a reference numeral 100 in FIG. 1 of JP-A No. 11-59314).

The gas generator housing 32 and pressurized gas chamber housing 22 are resistance-welded together in a joint portion 49. When the inflator 10 is incorporated in an airbag system, the ignition device 34 is connected to an external power source via a connector and a conductor wire.

The gas generating agent 36 may include, for example, 34 wt % of nitroguanidine as a fuel, 56 wt % of strontium nitrate as an oxidizing agent, and 10 wt % of carboxymethyl cellulose sodium as a binder (the discharged gas temperature is 700 to 1630° C.). A combustion residue generated when the gas generating agent 36 of such composition is combusted is strontium oxide (melting point 2430° C.). Therefore, the combustion residue solidifies as a lump (slag), without being in a molten state.

A first communication hole 38 located between the pressurized gas chamber 20 and gas generator 30 is closed by a bowl-shaped first rupturable plate 40, and the inside of the gas generator 30 is maintained under a normal pressure. The first rupturable plate 40 is resistance-welded to the gas generator housing 32 at a circumferential edge portion 40a.

Over the first rupturable plate 40, a cap 44 having gas discharge holes 42 is covered from the pressurized gas chamber 20 side. This cap 44 is attached so as to cover the first rupturable plate 40, thereby necessarily causing the ejection of combustion gases generated by combustion of the gas generating agent 36 from the gas discharge holes 42 via the cap 44.

The diameter of a plurality of gas discharge holes 42 is preferably 0.5 to 2 mm, more preferably 0.5 to 1.2 mm. The total opening surface area of a plurality of gas discharge holes 42 is preferably 20 to 1000 mm$^2$, more preferably 100 to 500 mm$^2$.

The cap 44 has a flange portion 46 that is obtained by bending an opening circumferential edge portion outwardly, and the cap is fixed by crimping the part (crimping part) 48 of the gas generator housing 32 at the flange portion 46.

A diffuser portion 50 having gas discharge ports 52 for discharging the pressurized gas and combustion gas is connected to the other end of the pressurized gas chamber 20, and the diffuser portion 50 and pressurized gas chamber housing 22 are resistance-welded in a joint portion 54.

The diffuser portion 50 has a cap-like shape having a plurality of gas discharge ports 52 through which a gas can pass.

Each diameter of a plurality of gas discharge ports 52 is preferably 0.5 to 2 mm, more preferably 0.5 to 1.2 mm. The total opening surface area of a plurality of gas discharge ports 52 is preferably 20 to 1000 mm$^2$, more preferably 100 to 500 mm$^2$.

A second communication hole 56 located between the pressurized gas chamber 20 and diffuser portion 50 is closed by a second rupturable plate 58, and a normal pressure is maintained inside the diffuser portion 50. The second rupturable plate 58 is resistance-welded to the diffuser portion 50 at a circumferential edge portion 58a.

The gas generator housing 32 in FIG. 1, which is equivalent to the tubular part in accordance with the present invention will be described below in greater detail with reference to FIG. 2(a), (b). FIG. 2(a) is a partially enlarged view of the configuration shown in FIG. 1, and FIG. 2(b) is a partially enlarged view of the configuration shown in FIG. 2(a).

The gas generator housing 32 shown in FIG. 2(a) is filled with the gas generating agent 36 (FIG. 1), and then the electric igniter 34 is inserted thereinto. This is a stage prior to crimping the distal end tubular portion. The gas generator housing 32 at this stage is the tubular part in accordance with the present invention, and the electric igniter 34 is a fixing object part.

The gas generator housing 32 has an annular chamfered portion 64 in which a corner at a boundary between an inner peripheral surface 62 of a circumferential wall and an annular end surface 63 on the side of an end opening 61 is chamfered.

Figure 2:
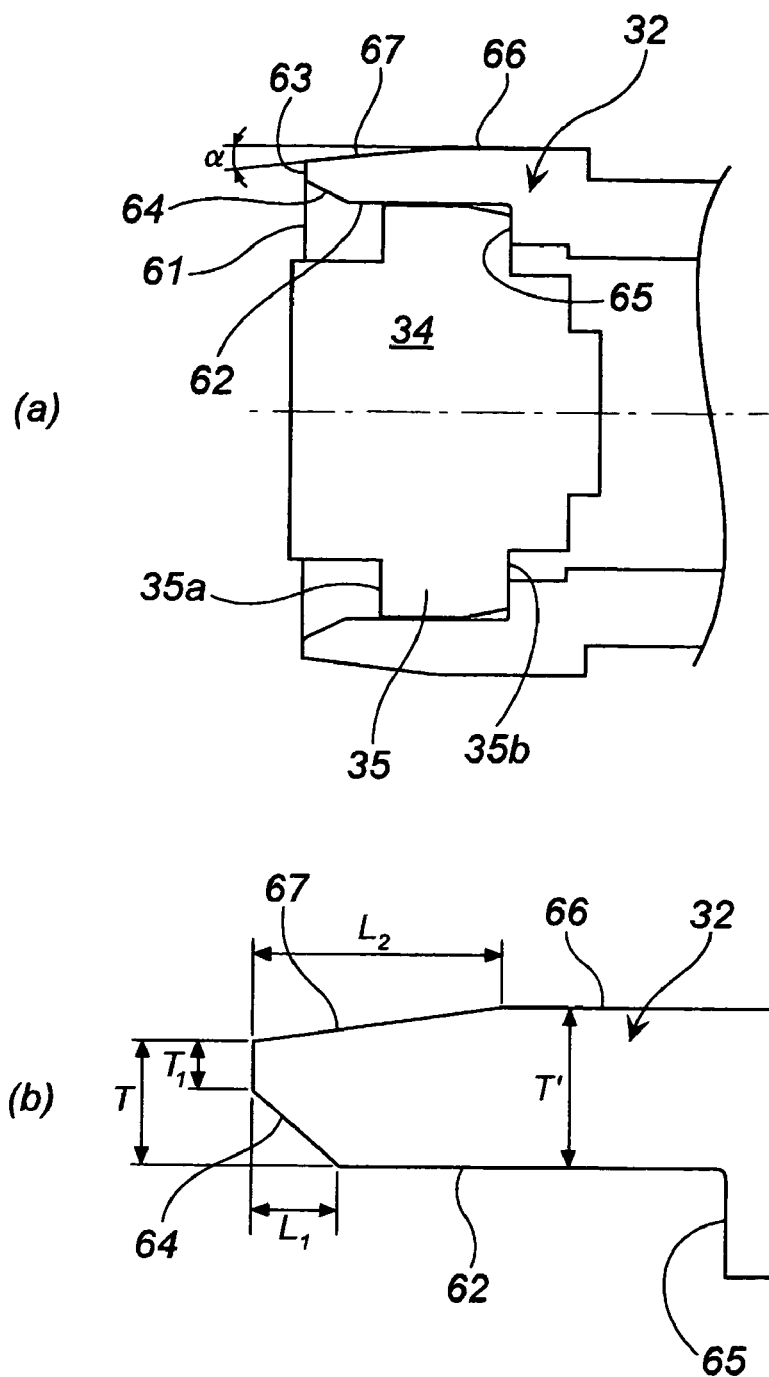
FIG. 2(a) shows a partially enlarged view of the configuration shown in FIG. 1 prior to crimping.
FIG. 2(b) shows a partially enlarged view of the configuration shown in FIG. 2(a)

The degree of chamfering of the chamfered portion 64 is such that chamfering is performed from a point at a thickness $T_1$ measured from an outer circumferential surface of the one end opening (this thickness coincides with that of the end surface 63, in FIG. 2) to a point at a length $L_1$ measured from an end surface of the opening, where the thickness of the circumferential wall of the opening 61 is represented as T. In this case, T, $T_1$, $L_1$ satisfy the following relationship.

$(T-T_1)/T$ is 0.05 to 0.9, preferably 0.1 to 0.8, and $(T-T_1)/L_1$ is 0.8 to 1.2, preferably 1.0.

A tapered portion 67 is formed on the side of the outer peripheral surface 66 at the end opening 61 of the gas generator housing 32. An angle α formed by the outer peripheral surface 66 and tapered portion 67, this angle being shown in FIG. 2(a), is preferably 4 to 9°, more preferably 5 to 8°. Further, a length $L_2$ of the tapered portion 67 from the end surface 63 is set to be larger than $L_1$, and the $L_2/L_1$ ratio is preferably 6 to 65, more preferably 8 to 20. When the tapered portion 67 is not formed, the thickness T is equal to a thickness T' shown in FIG. 2(b).

As shown in FIG. 2(a), an annular step 65 is formed at the inner peripheral surface 62 of the gas generator housing 32, and an inner annular surface 35b of the igniter collar 35 of the electric igniter 34 inserted therein abuts against the annular step 65.

Then, crimping is performed from the side of the outer peripheral surface 66 (tapered portion 67), and the circumferential wall including the deformed chamfered portion 64 is bent at a right angle so as to push against an outer annular surface 35a of the igniter collar 35 (state shown in FIG. 1). The crimping produces a state in which the igniter collar 35 is pressed against the annular step 65, and the electric igniter 34 is fixed inside the gas generator housing 32. In this case, because the crimped portion has the above-described specific shape, strains generated in the distal end tubular portion during crimping are absorbed and the occurrence of wrinkles or cracks is prevented. As a result, the occurrence of gap is prevented and air tightness is maintained.

<Method for Crimping the Tubular Part (Gas Generator Housing) in Accordance with the Present Invention>

Figure 3:
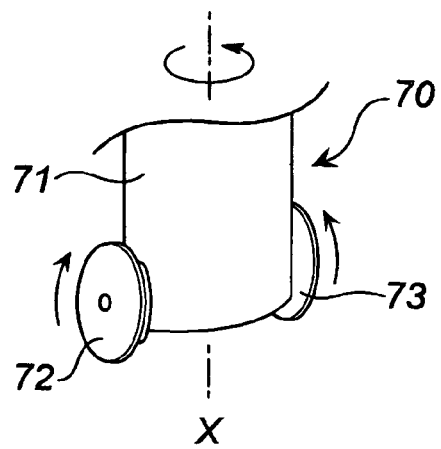
FIG. 3 shows a perspective view of the crimping tool used for crimping the tubular part in accordance with the present invention.
Figure 4:
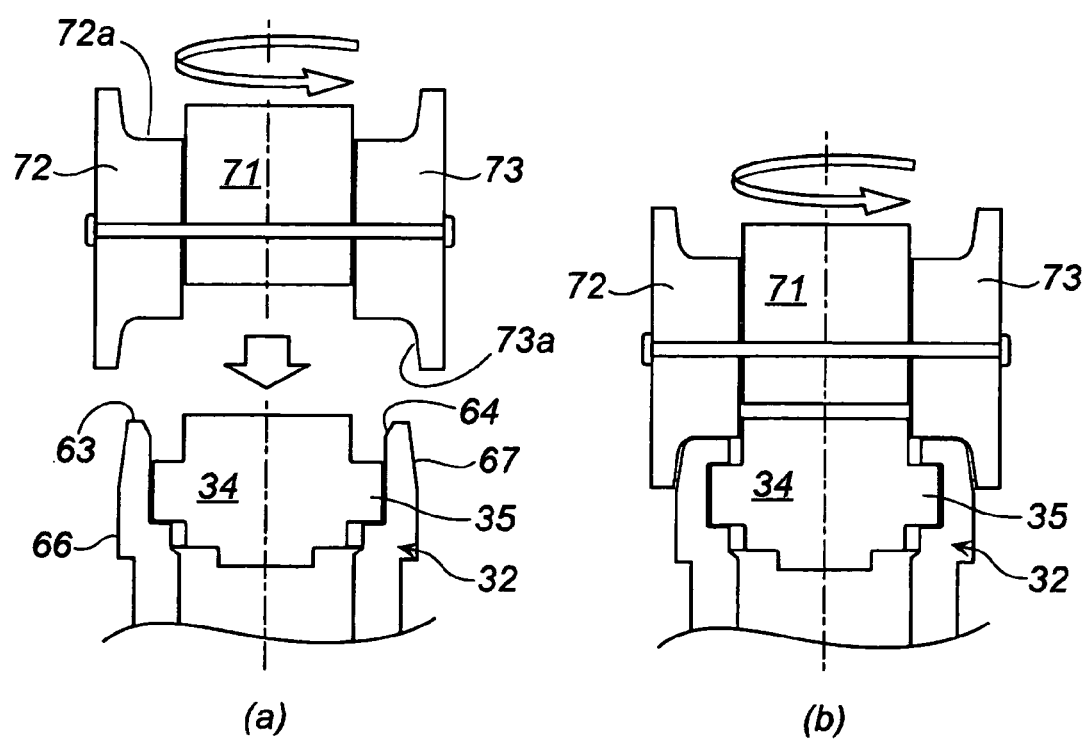
FIG. 4 shows an explanatory drawing illustrating a method of crimping the tubular part in accordance with the present invention.

A method of crimping the gas generator housing 32 in a state shown in FIG. 2(a) and fixing the electric igniter 34 will be explained below with reference to FIG. 3 to FIG. 5. FIG. 3 is a perspective view of a crimping tool used for crimping. FIG. 4(a), (b) are explanatory drawings illustrating the crimping operation using the crimping tool, FIG. 5 is a perspective view (the igniter is omitted) of the gas generator housing 32 after crimping.

A crimping tool 70 shown in FIG. 3 has a rod 71 and a pair of wheels 72, 73 that are attached, so that they can rotate in both directions, on both sides of the rod in the vicinity of the lower end thereof. As shown in FIG. 4, the wheels 72, 73 of the crimping tool 70 have respective crimping operation portions 72a, 73a made of curved surfaces on the peripheries thereof. FIG. 3 and FIG. 4 illustrate an embodiment of the crimping tool 70 having two wheels, but a crimping tool having three wheels that are equidistantly attached on the periphery of rod 71 can be also used for improved stability of crimping.

Figure 5:
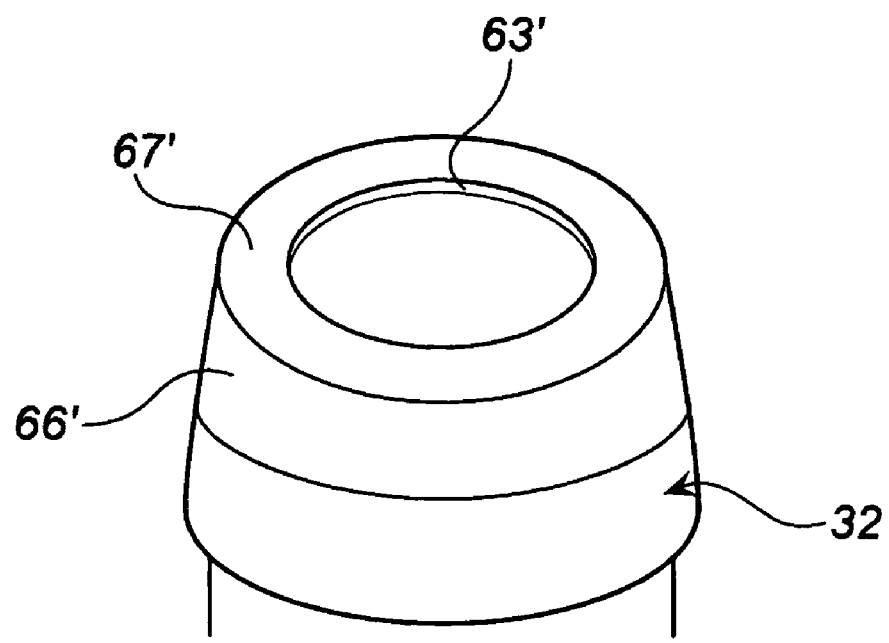
FIG. 5 shows a perspective view of the tubular part in accordance with the present invention after crimping.

As shown in FIG. 3 and FIG. 4(a), (b), a downward load is applied to the rod 71, while the rod 71 is being rotated in one direction, and the crimping operation portion 72a of the wheel 72 and the crimping operation portion 73a of the wheel 73 are pressed against the annular end surface 63 of the gas generator housing 32. In this case, because the rod 71 rotates in the direction shown by an arrow, the wheels 72, 73 come into contact with the annular end surface 63, while also rotating in the directions shown by respective arrows. Therefore, a uniform pressure is applied to the entire annular end surface 63. As a result, the distal end tubular portion including the chamfered portion 64 and tapered portion 67 is deformed so as to be bent at a right angle inwardly, as shown in FIG. 4(b) and FIG. 5. More specifically, the distal end tubular portion is bent on the outer annular surface 35a such that a portion in the inner peripheral surface 62 from the annular step 65, the distance to which corresponds to the thickness of the igniter collar 35 defined by the width from the outer annular surface 35a to the inner annular surface 35b, is originated for the bending. A portion 63', a portion 67', and a portion 66' shown in FIG. 5 represent portions that are respectively equivalent to the annular end surface 63, tapered portion 67, and outer peripheral surface 66 prior to deformation.

Where crimping is performed till a state shown in FIG. 4(b) and FIG. 5 is assumed, strains are easily induced and wrinkles or cracks are easily produced in the vicinity of portion 63' and a gap is easily formed between the crimped portion and the igniter 34 (igniter collar 34). However, in the case of crimping using the tubular part (gas generator housing 32) in accordance with the present invention, the strains occurring during deformation are absorbed and the occurrence of wrinkles and cracks is prevented by the action of the chamfered portion 64 having a specific shape.

EXAMPLES

Examples 1 to 4, Comparative Example 1

The electric igniter 34 (fixing object part) was inserted into the gas generator housing 32 (tubular part) having the chamfered portion 64 shown in FIG. 2(a), (b) and then crimping was performed using the crimping tool 70 shown in FIG. 3 so as to obtain a configuration shown in FIG. 4(a), (b). The case in which a gas generator housing having no chamfered portion 64 (but having the tapered portion 67) was used will be referred to as Comparative Example 1. The number of defective parts obtained in Examples and Comparative Example by crimping the number of parts shown in Table 1 were counted. As for the method for determining whether the part is defective, the parts were visually inspected, the presence of cracks on the outer surface shown in FIG. 5 was checked, and the parts in which the cracks had been found were considered to be defective.

Further, the following tests were conducted to evaluate whether the igniter 34 was fixed with a sufficient strength in Examples 1 to 4.

In a state after crimping (a state in which no wrinkles or cracks were observed, as shown in FIG. 4(b)), the following tests were performed:

(i) Rotation test: a test in which a dummy igniter 34 was used, a measurement jig was inserted into the collar of the igniter 34, and whether the igniter is rotated under a predetermined applied torque (1.3 Nm or more) was observed; and (ii) Fall-out test: a test in which the igniter 34 was pushed by a rod-shaped tool toward the opening 61 and whether the igniter could be held without falling out under a predetermined force was observed (after the opening 61 was crimped, the gas generator housing 32 was cut at the side of the first communication hole 38 so that the igniter 34 could be easily pushed by the rod-shaped tool).

TABLE 1

|  | Example 1 | Example 2 | Example 3 | Example 4 | Comparative Example 1 |
|---|---|---|---|---|---|
| Tubular part |  |  |  |  |  |
| T (mm) | 1.85 | 1.75 | 1.45 | 1.05 | 1.05 |
| $T_1$ (mm) | 1.75 | 1.55 | 0.95 | 0.15 | — |
| $L_1$ (mm) | 0.1 | 0.2 | 0.5 | 0.9 | — |
| $(T - T_1)/T$ | 0.05 | 0.11 | 0.34 | 0.86 | — |
| $(T - T_1)/L_1$ | 1.0 | 1.0 | 1.0 | 1.0 | — |
| $L_2$ (mm) | 6.2 | 6.2 | 6.2 | 6.2 | 6.2 |
| $\alpha(°)$ | 6 | 6 | 6 | 6 | 6 |
| Evaluation tests |  |  |  |  |  |
| Ratio of number of defective parts to number of evaluated parts | 0/100 | 0/100 | 0/50 | 0/100 | 10/50 |
| Rotation test | no rotation | no rotation | no rotation | no rotation | — |
| Fall-out test | no change | no change | no change | no change | — |

As shown in Table 1, no defective parts were found in Examples 1 to 4. This is apparently because the presence of the chamfered portion 64 and increased flexibility, thereby enabling the absorption of strains caused by deformation during crimping. On the other hand, in a total of ten defective parts of Comparative Example 1, cracks occurred in the portion 67' shown in FIG. 5.

The invention thus described, it will be obvious that the same may be varied in many ways. Such variation are not to be regarded as a departure from the spirit and scope of the invention, and all such modifications as would be obvious to one skilled in the art are intended to be included within the scope of the following claims.

The invention claimed is:

1. A tubular part for fixing and holding a fixing object part inserted therein, the fixing object part being fixed by inwardly crimping a circumferential wall on a side of one end opening of the tubular part,
comprising:
 an annular step formed at an inner peripheral surface of the circumferential wall of the tubular part;
 a chamfered corner provided, prior to crimping, on the inner peripheral surface of the circumferential wall at the one end opening;
 a tapered portion formed, prior to crimping, on an outer peripheral surface of the circumferential wall at the one end opening;
 an inner annular surface provided in the fixing object part attached to the annular step;
 an outer annular surface provided in the fixing object opposite to the inner annular surface and opposing the one end opening;
 a degree of chamfering being such that chamfering is performed between a point at a thickness T1 measured from an outer circumferential surface of the one end opening and a point at a length L1 measured from an end surface of the opening, and when a thickness of the circumferential wall of the opening is represented as T,
 $(T-T_1)/T$ being 0.05 to 0.9,
 $(T-T_1)/L_1$ being 0.8 to 1.2,
 a length L2 of the tapered portion from the end surface of the one end opening prior to crimping being larger than L1; and
 a length from the end surface of the one end opening to the outer annular surface prior to crimping being larger than L1 but smaller than L2.

2. The tubular part according to claim 1, wherein the tubular part is a part for an inflator for a restraining device for a vehicle, and serves to insert and fix an electric igniter used in the inflator.

3. The tubular part according to claim 2, wherein the fixing object part is an igniter collar of an electric igniter for an inflator.

4. The tubular part according to claim 1, wherein an angle formed by the outer peripheral surface and the tapered portion is 4 to 9 degrees.

5. A structure for holding an object in a tubular part, the object being fixed by inwardly crimping a circumferential wall of one end opening of the tubular part, the structure comprising:
 an annular step formed in an inner peripheral surface of the circumferential wall of the tubular part;
 a chamfered portion extending between an end surface of the tubular part and an inner peripheral surface, a length, prior to crimping, in a longitudinal direction of the tubular part from the end surface to where the chamfered portion merges the inner peripheral surface being L1;
 a tapered portion extending between the end surface and an outer peripheral surface of the circumferential wall, a length, prior to crimping, in the longitudinal direction from the end surface to where the tapered portion merges the outer peripheral surface being L2;
 an inner annular surface provided in the object in contact with the annular step;
 an outer annular surface provided in the object opposite to the inner annular surface and opposing the one end opening;
 wherein the length L2 being larger than L1,
 a length from the end surface to the outer annular surface being larger than L1 and smaller than L2, and
 a bend is formed in the tapered portion after crimping the circumferential wall inwardly.

* * * * *